Feb. 15, 1949.                W. C. JOHNSON                2,461,738
                          DEVICE FOR SOLVING EQUATIONS
Filed June 10, 1946                                    2 Sheets-Sheet 1
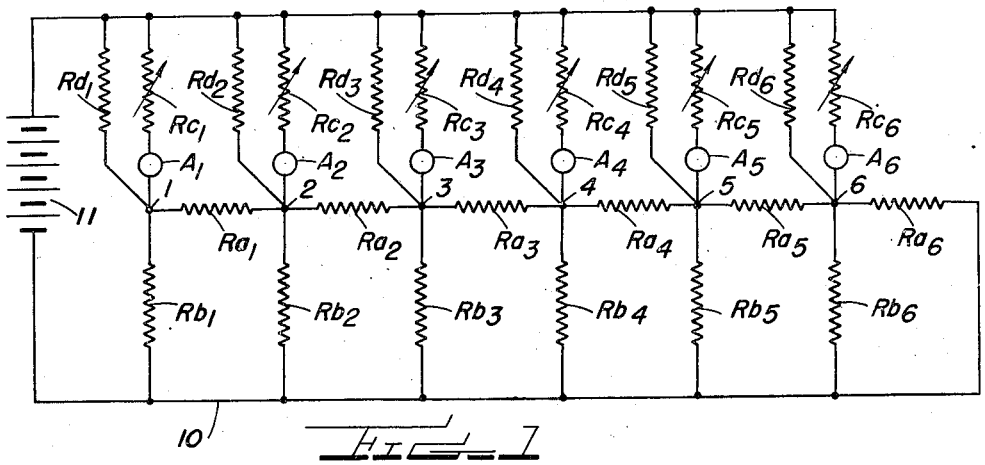
Fig. 1
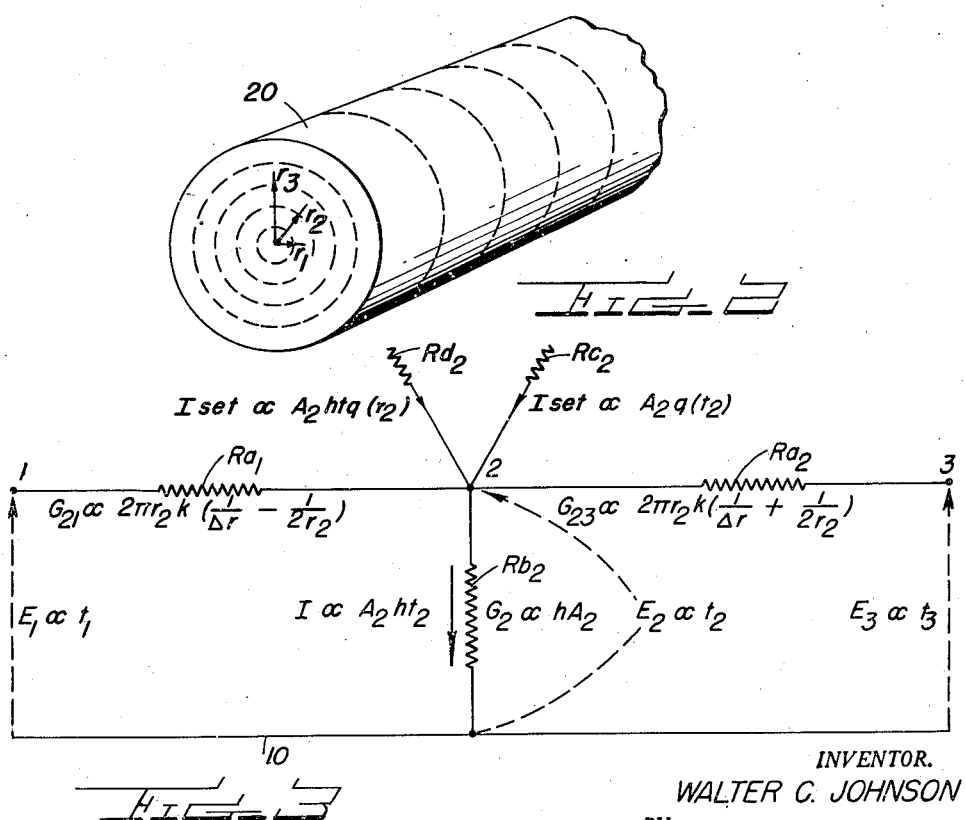
Fig. 2
Fig. 3
INVENTOR.
WALTER C. JOHNSON
BY Stowell + Evans
ATTORNEYS INVENTOR.
WALTER C. JOHNSON
BY Stowell & Evans
ATTORNEYS Patented Feb. 15, 1949

2,461,738

UNITED STATES PATENT OFFICE 2,461,738

DEVICE FOR SOLVING EQUATIONS

Walter C. Johnson, Princeton, N. J.

Application June 10, 1946, Serial No. 675,799

12 Claims. (Cl. 235—61)

This invention relates to a device for solving equations and is particularly directed to an electrical network for the solution of non-linear differential equations.

The solution of differential equations representing physical or chemical processes involving interdependent variables is usually difficult and time-consuming.

I have found that such equations may be readily and quickly solved by means of electrical networks including a plurality of spaced junction points, a set of impedance links connecting adjacent junction points together, a conductor providing a reference voltage level, a set of impedance links connecting each of the junction points to the reference conductor, means for ascertaining the potentials of the junction points with reference to the reference conductor, and a set of impedance links connecting a source of current to each of said junction points, the individual impedance links of at least one of said sets of links being independently adjustable and means for ascertaining the current flow in at least the independently adjustable set of links.

In the use of the network of the invention for the solution of non-linear differential equations, the junction points represent successive values of an independent variable (typically successive points in space or time) for which solutions of the equation are desired; the values of the impedance links connecting the source of current with the junction points are selected to provide currents proportional to the rate of a primary process, such as the generation of heat by a chemical reaction, occurring at the successive values of the independent variable; the values of the impedance links between junction points are selected to provide currents proportional to the rate of a further process dependent on the primary process and operating between successive values of the independent variable; the values of the impedance links between the junction points and the reference conductor are selected to provide currents proportional to the rate of a process dependent on the net resultant of the primary process and said further process at successive values of the independent variable; the potential differences between the successive junction points and the reference conductor are then proportional to the values of the dependent variable at each of the successive values of the independent variable. When the relation between a component process and the dependent variable is non-linear, the corresponding set or sets of impedance links must be independently adjustable and the network is balanced by adjusting the values of the links of the adjustable set in successive closer approximations to the known relation to the dependent variable until balance is attained. For the solution of some types of problems, means are provided to supply, in or across the corresponding set of impedance links, currents proportional to a process competing with or additive to the process represented by such sets of links.

The invention will be more particularly described with reference to the accompanying drawings in which:

Fig. 1 is a circuit diagram of a network embodying the principles of the invention;

Fig. 2 is a diagrammatic representation of a problem solvable by the apparatus of the invention;

Fig. 3 is a diagrammatic representation of a portion of the apparatus of Fig. 1 illustrating the application of the apparatus in the solution of the problem illustrated in Fig. 2, and Figs. 4, 5 and 6 are circuit diagrams of modified embodiments of the invention.

Figure 4:
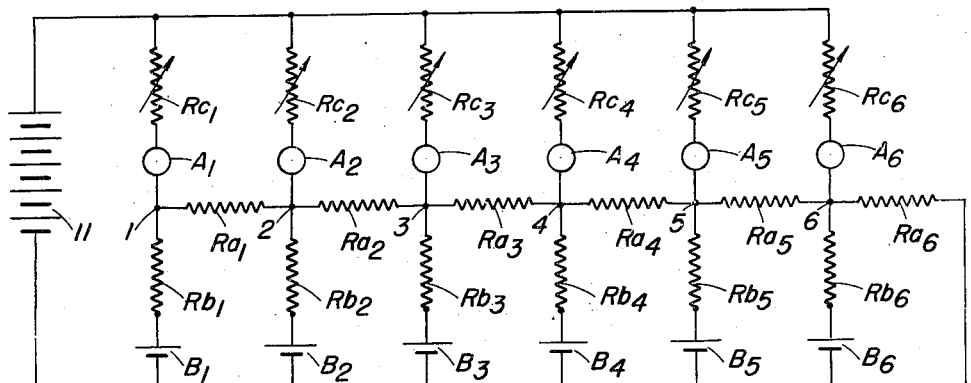

Fig. 1 diagrammatically illustrates a network including junction points $1, 2, 3 \ldots$, connected in series through resistances $Ra_1, Ra_2, Ra_3 \ldots$ 10 is a reference conductor to which the junction points are connected through resistances $Rb_1$, $Rb_2$, $Rb_3 \ldots$ A voltage source, such as battery 11, is connected at one terminal to the reference conductor 10 and at the other terminal to the junction points through variable resistances $Rc_1, Rc_2, Rc_3 \ldots$, thereby providing a current source to each junction point. The junction points are further connected to the battery 11 through resistances $Rd_1, Rd_2, Rd_3 \ldots$ In order to adapt the device to the solution of a wide variety of problems, the resistances $Ra_1, Ra_2$, $Ra_3 \ldots$, $Rb_1, Rb_2, Rb_3 \ldots$ and $Rd_1, Rd_2$, $Rd_3 \ldots$ may be variable or they may be readily replaced by other resistances of suitable values. Ammeters $A_1, A_2, A_3$ may be replaced by a single current indicating instrument with suitable switches and leads as only a single current value needs to be read at one time.

Means, such as a voltmeter with suitable switches and leads (not shown), are also provided for reading the voltages from each of the junction points to the reference conductor. A single instrument may also be provided for this purpose with suitable switches for successively connecting the instrument between each of the junction points and the reference conductor.

A typical problem solvable by the networks of the invention is diagrammatically illustrated in Fig. 2, which represents a heat-flow problem in a catalytic converter. In the converter a cylindrical body 20 of porous solid catalyst has a gaseous reaction mixture passing longitudinally through it. A chemical reaction releases heat in the solid as a non-linear function of the temperature. Part of this heat is conducted to the cooled outer surface of the cylinder and the remainder of the heat is transferred to the gas. The problem is to find the temperature of the solid as a function of the radius, the gas temperature as a function of the radius being known.

The equation which describes the flow of heat in any slice of the cylinder taken normally to the axis is $$k\left(\frac{d^2t}{dr^2}+\frac{1}{r}\frac{dt}{dr}\right)-ht+ht_g(r)+q(t)=0 \qquad (1)$$

where $t$=temperature ($t=0$ can be chosen at outer surface)
$r$=radius
$k$=conductivity of solid
$h$=heat transfer coefficient from solid to gas
$t_g(r)$=gas temperature as function of radius
$q(t)$=rate of heat release per unit volume; a non-linear function of temperature.

Divide the cross-section of the slice into annular segments. The radial widths may be equal or unequal; for simplicity three adjacent segments of equal radial widths will be considered, their mean radii being $r_1$, $r_2$, $r_3$, and $r_3-r_2=r_2-r_1=\Delta r$. The temperature of the solid at these radii are $t_1$, $t_2$ and $t_3$, respectively.

If a second-degree equation is fitted to the temperature vs. radius function at the three points $(t_1, r_1)$, $(t_2, r_2)$, $(t_3, r_3)$, then at point 2 we have $$\left.\frac{dt}{dr}\right|_2=\frac{t_3-t_1}{2\Delta r} \text{ and } \left.\frac{d^2t}{dr^2}\right|_2=\frac{t_3+t_1-2t_2}{\Delta r^2}$$

Substituting these approximations into the differential equation (1) and multiplying by the area of the segment ($A_2=2\pi r_2\Delta r$), we obtain an equation to be satisfied at point 2 of the network of Figs. 1 and 3:

Heat released per unit time per unit axial length in segment 2=

$$A_2q(t_2)=2\pi r_2k\left(\frac{1}{\Delta r}-\frac{1}{2r_2}\right)(t_2-t_1)-$$
$$2\pi r_2k\left(\frac{1}{\Delta r}+\frac{1}{2r_2}\right)(t_3-t_2)+A_2[ht_2-ht_g(r_2)]$$

This equation is the one that governs the currents at the junction point of the network shown in Fig. 3, where the voltage of point 2 above the reference conductor 10 represents the temperature of the solid at $r_2$ in the cylinder, measured from any preselected reference level, for example, from the temperature of the outer shell of the cylinder.

In using the network of Fig. 1, for the solution of this problem, the junction points 1, 2, 3 . . . represent the successive segments of the cylinder; $Ra_1$, $Ra_2$, $Ra_3$ . . . represent the resistances to heat flow between successive segments, the currents flowing through these resistances in the network being proportional to the rates of transfer of heat from solid to solid radially between the segments; and $Rb_1$, $Rb_2$, $Rb_3$ . . . represent the thermal resistance to heat flow from the solid to the gas, the conductances in these links being proportional to the rate of heat transfer from the solid to the gas. $Rd_1$, $Rd_2$, $Rd_3$ . . . supply currents which when flowing alone through $Rb_1$, $Rb_2$, $Rb_3$ . . . produce voltage drops proportional to the gas temperatures in the corresponding segments. This introduces the equivalent effect of a current source in the links from the junction points to the reference conductor proportional to the rate of flow of heat from the gas to the solid, a competing process. (This can be effected by means of individual current sources in the links between the junction points and the reference conductor as in Fig. 4.) Variable resistances $Rc_1$, $Rc_2$, $Rc_3$ . . . are set to provide a current proportional to the rate of heat generation at the temperature of the successive segments, measured by the voltages from the successive junction points to the reference conductor. The values of $Rc_1$, $Rc_2$, $Rc_3$ . . . are successively adjusted to provide currents, as read on ammeters $A_1$, $A_2$, $A_3$ . . . , related to the corresponding voltages between the successive junction points and the reference conductor in accordance with the known relation between rate of reaction (heat generation) and temperature for the process under study.

In practice, currents in $A_1$, $A_2$, $A_3$ . . . are first set at values corresponding to the gas temperatures. The voltage of each junction point is then read and the corresponding variable resistance is adjusted to provide a current corresponding to $q(t)$, using a graph or tabulated values of $q$ v. $t$. This process is again repeated through the whole network until no further changes are necessary. Frequently, three sets of adjustments across the network will bring the network of Fig. 1 into balance.

For example, the network of Fig. 1 will be applied to the solution of a specific problem of the type illustrated by Fig. 2, in which the outside diameter of the cylinder is 0.12 foot, $h$ is 2.44 chu/sec./cu./ft./°C., and $k$ is $10^{-3}$ chu/ft./sec./°C. Using a network of six nodes the cylinder will be divided into annular segments of equal radius, $\Delta r=0.02$ foot. In Fig. 1, junction 1 represents the center of the cylinder, while successively higher numbered junction points represent successively greater radii, the extreme right end of the network representing the outer surface of the cylinder. Temperatures are measured in degrees above the temperature of the outer surface of the cylinder and $t_R$ is taken as 0, thereby eliminating resistances $Rd_1$ . . . from the net work.

The non-linear function $q(t)$ is represented by the following table of values:

| $t$ | $q(t)$ |
|---|---|
| 0 | 12.1 |
| 1 | 12.5 |
| 2 | 13.0 |
| 3 | 13.7 |
| 4 | 14.6 |
| 5 | 15.6 |
| 6 | 17.0 |
| 7 | 18.8 |
| 8 | 20.4 |
| 9 | 22.7 |
| 10 | 25.3 |

The boundary conditions of the problem are as follows: At the outer radius the temperature is 0. This is obtained by connecting the right hand end of $Ra_6$ to the ground wire. The boundary condition at the center of the cylinder is that $dt/dr$ is 0.

The current supply $11$ is, for example, 300 volts. The quantities of the various sections of the network, except resistances $Rd_1\ldots$ which are disconnected, are determined as illustrated in Fig. 3. Using a constant proportionality factor 0.0636 for conductances and currents, to provide convenient values for the resistances, the data given above lead to the following values for the resistances which are fixed during the solution of the problem:

| | |
|---|---|
| $Ra_1$—5,000 ohms | $Rb_1$—20,480 ohms |
| $Ra_2$—1,667 ohms | $Rb_2$— 2,560 ohms |
| $Ra_3$—1,000 ohms | $Rb_3$— 1,280 ohms |
| $Ra_4$— 714 ohms | $Rb_4$— 854 ohms |
| $Ra_5$— 556 ohms | $Rb_5$— 641 ohms |
| $Ra_6$— 454 ohms | $Rb_6$— 454 ohms |

Variable resistances $Rc_1, Rc_2, \ldots$ are then adjusted to give readings of current flow to junctions $1, 2, \ldots$ (proportional to $q$; these are conveniently read as voltages across suitable current shunts) and of voltages across $Rb_1, Rb_2, \ldots$ (these are proportional to $t$), which at each junction point represent intersecting values on the graph of $q(t)$ represented by the foregoing table. The first settings of the current values to junction points $1, 2, \ldots$ are suitably based on $q$ values equivalent to estimated or experimentally determined gas temperatures at the corresponding radii of the cylinder. Usually three successive adjustments across the network will suffice to obtain values of $q$ and $t$ representing at each junction point a point on the $q(t)$ curve. The voltages from the junction points to ground then are proportional to the temperatures at the corresponding radii of the cylinder. In the specific example they are found to be:

| $r$ | $t$ [1] |
|---|---|
| 0 | 7.45 |
| .02 | 7.35 |
| .04 | 7.15 |
| .06 | 6.70 |
| .08 | 5.35 |
| .10 | 3.55 |

[1] In °C above the surface of the cylinder.

The term "chu" in the foregoing example designates the centigrade heat unit, which is the amount of heat required to raise the temperature of one pound of water from 15° to 16° C.

As was noted above, a competing process, such as the transfer of heat from gas to solid in the specific problem discussed above, may be introduced by means of auxiliary current sources in the proper links. In the network of Fig. 4, this is done by means of batteries $B_1, B_2, B_3 \ldots$, which are the equivalent of the links containing resistances $Rd_1, Rd_2, Rd_3 \ldots$ in Fig. 1. In general, the use of separate current sources is not as convenient as the method of Fig. 1.

Figure 5:
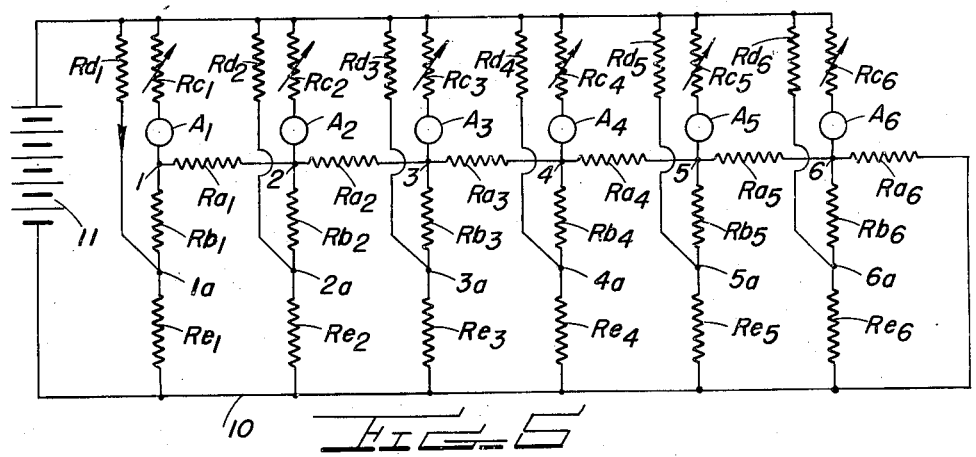
Figure 6:
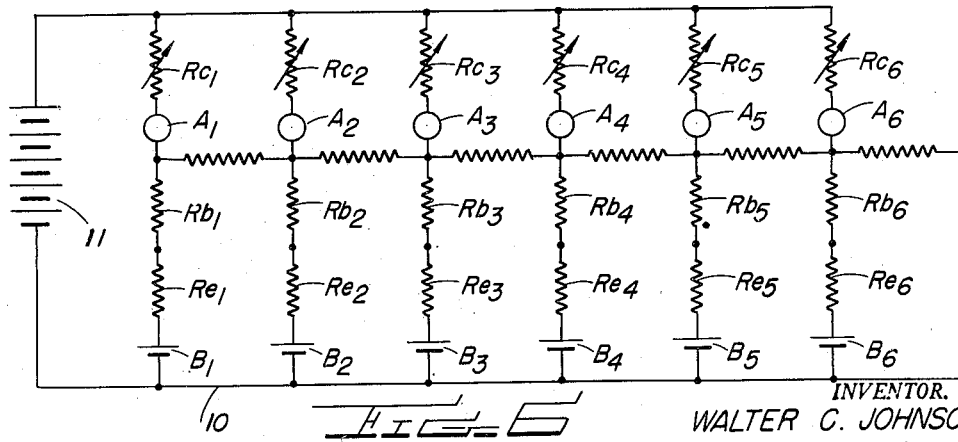

To facilitate the use of the networks in obtaining solutions in successive slices of the cylinder $20$ of Fig. 2, or in any similar problem, wherein one set of solutions introduces a further variable affecting the values of the next set of solutions, the modifications shown in Figs. 5 and 6 are provided.

In Fig. 5, the effect of heat flow to the gas from the solid at temperatures increasing at different rates in the segments of the successive slices of the cylinder is introduced by means of auxiliary resistances $Re_1, Re_2, Re_3 \ldots$ between the junction points and the reference conductor and currents supplied to auxiliary junction points $1a, 2a, 3a \ldots$ through resistances $Rd_1, Rd_2, Rd_3 \ldots$. The currents thus introduced into the network are proportional to the rate of flow of heat from the solid to the gas at gas temperatures calculated from the temperatures of the solid obtained in the corresponding segments of the preceding slice, the width of the slice and the heat transfer coefficient.

In Fig. 6, the same effect is introduced into the network by means of currents supplied by batteries $B_1, B_2, B_3 \ldots$ and resistances $Re_1, Re_2, Re_3 \ldots$.

It will be apparent from the foregoing discussion that the networks of the invention are subject to a wide range of variation without departing from the principles of the invention as defined in the claims. Alternating currents may be used instead of direct current, and inductances or capacitances or combinations thereof may be used in the impedance links instead of resistances.

I claim:

1. Apparatus for the solution of non-linear differential equations comprising an electrical network including a plurality of spaced junction points, a set of impedance links connecting adjacent junction points together, a conductor providing a reference voltage level, a set of impedance links connecting each of the junction points to the reference conductor, and a set of impedance links connecting a source of current to each of said junction points, the individual impedance links of at least one of said sets of links being independently adjustable, means for ascertaining the potentials of the junction points with reference to the reference conductor, and means for ascertaining the current flow in at least the independently adjustable set of impedance links.

2. Apparatus for the solution of non-linear differential equations comprising an electrical network including a plurality of spaced junction points, a set of impedance links connecting adjacent junction points together, a conductor providing a reference voltage level, a set of impedance links connecting each of the junction points to the reference conductor, and a set of impedance links connecting a source of current to each of said junction points, the individual impedance links of at least one of said sets of links being independently adjustable, means for supplying further currents to said junction points, means for ascertaining the potentials of the junction points with reference to the reference conductor, and means for ascertaining the current flow in at least the independently adjustable set of impedance links.

3. Apparatus for the solution of non-linear differential equations comprising an electrical network including a plurality of spaced junction points, a set of impedance links connecting adjacent junction points together, a conductor providing a reference voltage level, a set of impedance links connecting each of the junction points to the reference conductor, and a set of impedance links connecting a source of current to each of said junction points, the individual impedance links of at least one of said sets of links being independently adjustable, means for supplying further currents across the impedance links of one of said sets, means for ascertaining the potentials of the junction points with reference to the reference conductor, and means for ascertaining the current flow in at least the independently adjustable set of impedance links.

4. Apparatus for the solution of non-linear differential equations comprising an electrical network including a plurality of spaced junction points, a set of impedance links connecting adjacent junction points together, a conductor providing a reference voltage level, a set of impedance links connecting each of the junction points to the reference conductor, and a set of impedance links connecting a source of current to each of said junction points, the individual impedance links of at least one of said sets of links being independently adjustable, means for supplying further currents in the impedance links of one of said sets, means for ascertaining the potentials of the junction points with reference to the reference conductor, and means for ascertaining the current flow in at least the independently adjustable set of impedance links.

5. Apparatus for the solution of non-linear differential equations comprising an electrical network including a plurality of spaced junction points, a set of impedance links connecting adjacent junction points together, a conductor providing a reference voltage level, a set of impedance links connecting each of the junction points to the reference conductor, a set of variable-impedance links connecting a source of current to each of said junction points, means for ascertaining the potentials of the junction points with reference to the reference conductor, and means for ascertaining the current flow in the variable-impedance links.

6. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, and a set of resistance-containing links connecting a source of current to each of said junction points, the individual resistances of at least one of said sets of links being independently adjustable, means for ascertaining the potentials of the junction points with reference to the reference conductor, and means for ascertaining the current flow in at least the set of links including the independently adjustable resistances.

7. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, a set of variable-resistance links connecting a source of current to each of said junction points, means for ascertaining the potentials of the junction points with reference to the reference conductor, and means for ascertaining the current flow in the variable-resistance links.

8. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, and a set of resistance-containing links connecting a source of current to each of said junction points, the individual resistances of at least one of said sets of links being independently adjustable, means for supplying further currents to said junction points, means for ascertaining the potentials of the junction points with reference to the reference conductor, and means for ascertaining the current flow in at least the set of links including the independently adjustable resistances.

9. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, and a set of resistance-containing links connecting a source of current to each of said junction points, the individual resistances of at least one of said sets of links being independently adjustable, means for supplying further currents across the resistance-containing links of one of said sets, means for ascertaining the potentials of the junction points with reference to the reference conductor, and means for ascertaining the current flow in at least the set of links including the independently adjustable resistances.

10. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, and a set of resistance-containing links connecting a source of current to each of said junction points, the individual resistances of at least one of said sets of links being independently adjustable, means for supplying further currents in the resistance-containing links of one of said sets, means for ascertaining the potentials of the junction points with reference to the reference conductor, and means for ascertaining the current flow in at least the set of links including the independently adjustable resistances.

11. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, a set of variable-resistance links connecting a source of current to each of said junction points, a further set of resistance-containing links supplying currents to said junction points in parallel with said variable-resistance links, means for ascertaining the potentials of the junction points with reference to the reference conductor, and means for ascertaining the current flow in the variable-resistance links.

12. Apparatus for the solution of non-linear differential equations comprising an electrical network including a plurality of spaced junction points, a set of resistance-containing links connecting adjacent junction points together, a conductor providing a reference voltage level, a set of resistance-containing links connecting each of the junction points to the reference conductor, a set of variable-resistance links connecting a source of current to each of said junction points, means supplying further currents in the resistance-containing links connecting said junction points to the reference conductor, means for ascertaining the potentials of the junction points with reference to the reference conductor, and means for ascertaining the current flow in the variable-resistance links.

WALTER C. JOHNSON.

REFERENCES CITED

The following references are of record in the file of this patent:

UNITED STATES PATENTS

| Number | Name | Date |
|---|---|---|
| 2,087,667 | Hedin | July 20, 1937 |
| 2,323,588 | Enns | July 6, 1943 |